US010819849B1

(12) United States Patent
Bondareva et al.

(10) Patent No.: US 10,819,849 B1
(45) Date of Patent: Oct. 27, 2020

(54) DEVICE, SYSTEM AND METHOD FOR ADDRESS VALIDATION

(71) Applicant: MOTOROLA SOLUTIONS, INC., Chicago, IL (US)

(72) Inventors: Mariya Bondareva, Bolingbrook, IL (US); David Kaleko, Oak Park, IL (US); Yanlin Han, Naperville, IL (US)

(73) Assignee: MOTOROLA SOLUTIONS INC., Chicago, IL (US)

( * ) Notice: Subject to any disclaimer, the term of this patent is extended or adjusted under 35 U.S.C. 154(b) by 0 days.

(21) Appl. No.: 16/597,941

(22) Filed: Oct. 10, 2019

(51) Int. Cl.
*H04M 11/04* (2006.01)
*H04M 3/42* (2006.01)
*H04M 3/51* (2006.01)
*G10L 15/26* (2006.01)
*H04W 4/90* (2018.01)

(52) U.S. Cl.
CPC ....... *H04M 3/42357* (2013.01); *G10L 15/265* (2013.01); *H04M 3/5116* (2013.01); *H04W 4/90* (2018.02); *H04M 2242/04* (2013.01)

(58) Field of Classification Search
CPC ..... H04W 4/90; H04W 76/50; H04M 3/5116; H04M 2242/04
See application file for complete search history.

(56) References Cited

U.S. PATENT DOCUMENTS

| 6,106,459 | A | 8/2000 | Clawson |
| 7,054,741 | B2 | 5/2006 | Harrison et al. |
| 8,219,550 | B2 | 7/2012 | Merz et al. |
| 8,930,044 | B1* | 1/2015 | Peeters ................ B64C 39/024 701/2 |
| 2010/0177343 | A1* | 7/2010 | Shapiro .............. G06Q 10/0637 358/1.15 |
| 2011/0137745 | A1* | 6/2011 | Goad ..................... G06Q 30/02 705/26.9 |
| 2015/0097670 | A1 | 4/2015 | Chitre et al. |
| 2015/0350836 | A1 | 12/2015 | Smith |
| 2016/0309026 | A1* | 10/2016 | Sterman .............. H04M 3/5116 |
| 2018/0275244 | A1 | 9/2018 | Meredith et al. |

FOREIGN PATENT DOCUMENTS

| EP | 1391127 | 11/2002 |
| EP | 3440855 | 10/2017 |
| WO | 97/50002 A | 12/1997 |

* cited by examiner

*Primary Examiner* — Barry W Taylor
(74) *Attorney, Agent, or Firm* — Perry + Currier, Inc.

(57) ABSTRACT

A device, system and method for address validation is provided. A computing device determines an address associated with a call. The computing device determines whether the address has previously been corrected to one or more different addresses using historical address correction data. In response the address having been previously corrected to the one or more different addresses, the computing device controls a notification device to provide a notification.

19 Claims, 5 Drawing Sheets

DEVICE, SYSTEM AND METHOD FOR ADDRESS VALIDATION

BACKGROUND OF THE INVENTION

Address validation is a major issue for public-safety answering points (PSAPs), such as 911 call centers. For example, when an address of an incident is incorrectly identified, first responders may be dispatched to an incorrect address which may generally waste first responder resources (e.g., physical resources and/or network resources and/or processing resources) and/or such an incorrect dispatch may cause the first responders to not properly respond to an incident.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Address validation is a major issue for public-safety answering points (PSAPs), such as 911 call centers. For example, when an address of an incident is incorrectly identified, first responders may be dispatched to an incorrect address which may generally waste first responder resources (e.g., physical resources and/or network resources and/or processing resources) and/or such an incorrect dispatch may cause the first responders to not properly respond to an incident. For example, a caller on a call may report an incorrect address at which an incident has occurred and/or a speech-to-text engine may incorrectly transcribe an address on the call and/or an automatic location identification system may not accurately detect an address, for example via metadata of the call.

An aspect of the present specification provides a method comprising: determining, at a computing device, an address associated with a call; determining, at the computing device, whether the address has previously been corrected to one or more different addresses using historical address correction data; and in response to the address having been previously corrected to the one or more different addresses, controlling, at the computing device, a notification device to provide a notification.

Another aspect of the present specification provides a computing device comprising: a communication unit; and a controller configured to: determine an address associated with a call received via the communication unit; determine whether the address has previously been corrected to one or more different addresses using historical address correction data; and in response to the address having been previously corrected to the one or more different addresses, control a notification device to provide a notification.

Figure 1:
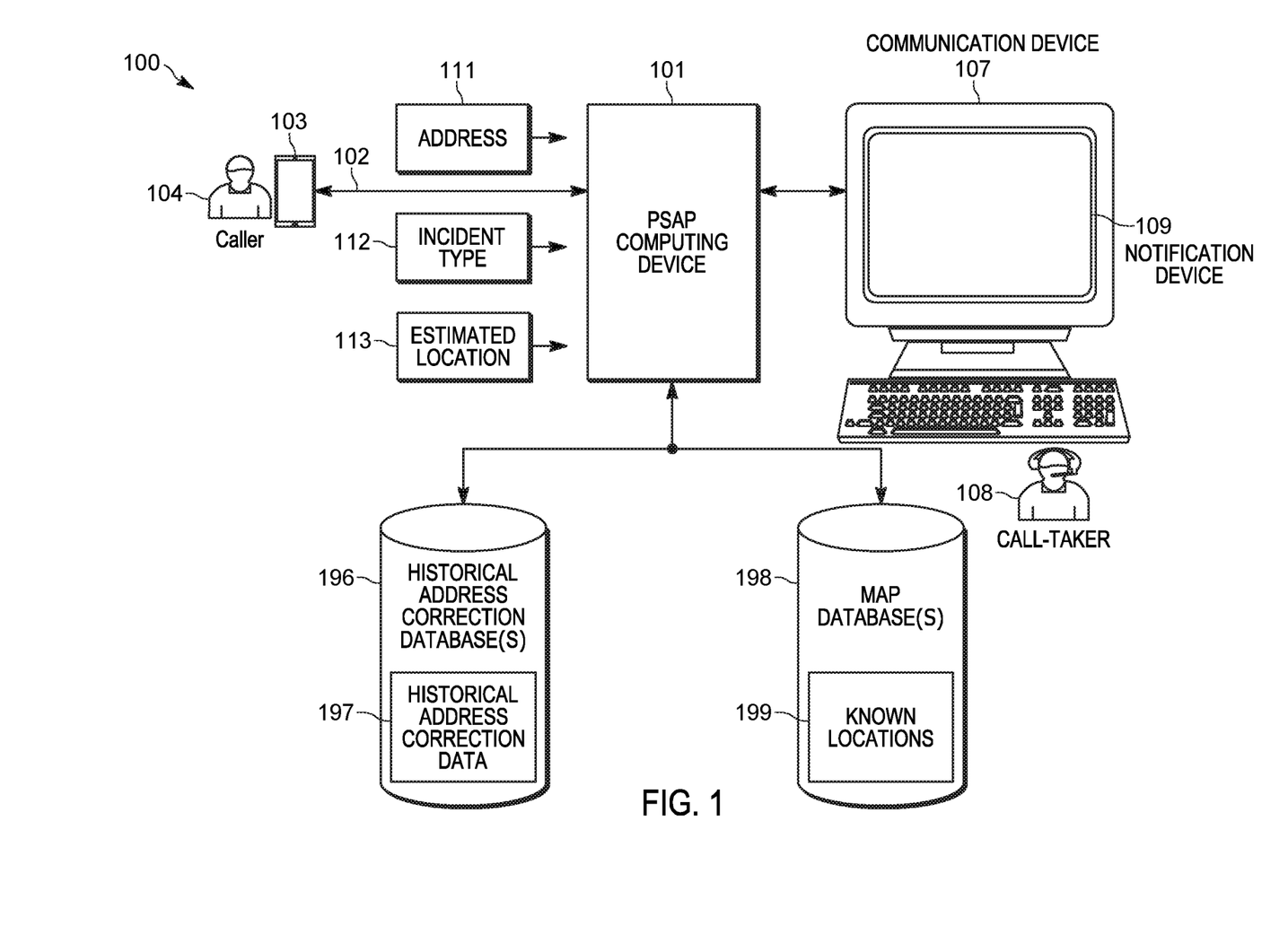
FIG. 1 is a system for address validation, in accordance with some examples.

Attention is directed to FIG. 1, which depicts an example system 100 for address validation. The system 100 comprises a computing device 101, which may comprise (e.g. as depicted) a public-safety answering point (PSAP) computing device. The computing device 101, interchangeably referred to hereafter as the device 101, is generally configured to receive calls, for example, as depicted, a call 102 from a calling device 103 operated by a caller 104.

As depicted, the system 100 further comprises a communication device 107 in communication with the device 101 via a communication link. As depicted, the communication device 107 may comprise a dispatch terminal to which the device 101 forwards the call 102. The communication device 107 is generally operated by a human user, for example, as depicted, a call-taker 108, such as a 911 call center operator, a dispatcher, and the like. The communication device 107 generally includes a notification device 109, as depicted a display screen; however the notification device 109 may include any suitable combination of one or more notification devices such as a display screen, a speaker, and the like.

As depicted, the calling device 103 comprises a mobile device, but the calling device 103 may comprise any suitable communication device for making a call to the device 101 including, but not limited to, the depicted mobile device, public switched telephone network (PSTN) telephones, laptops, personal computers, and the like. Furthermore, the call 102 may occur via any suitable wireless or wired network and may include, but are not limited to, mobile phone calls, PSTN calls, Internet Protocol (IP) calls, calls made using applications, and the like.

While one calling device 103 is depicted in FIG. 1, the system 100 may comprise any suitable number of calling devices 103 and associated callers 104; similarly, while one communication device 107 is depicted in FIG. 1, the system 100 may comprise any suitable number of communication devices 107 (e.g. dispatch terminals) and associated call-takers 108 and/or human users.

The device 101 may be configured to receive the calls 102, from the calling device 103 and the like, in association with a public safety answering point, a 911 call center, and the like. For example, a communication device 107 may comprise a terminal of the PSAP, and a human user of a communication device 107 may comprise a call-taker 108 of the PSAP.

However, while present examples will be described with respect to a PSAP, the device 101 may be configured to receive calls 102 for any suitable type of call center, dispatch center, and the like.

As depicted, for example, the caller 104 has operated the calling device 103 to initiate the call 102 using a number (e.g. "911") for the PSAP to report an incident. The device 101 automatically receives and/or answers the call 102 thereby causing a communication link between the device 101 and the calling device 103 to be generated using any suitable combination of wired and/or wireless networks. Communication links between components of the system 100 are depicted in FIG. 1, and throughout the present specification, as double-ended arrows between respective components; the communication links may include any suitable combination of wireless and/or wired links and/or wireless and/or wired communication networks. Hence, for example, communication links between the device 101 and the communication device 107 are generally established and the device 101 may forward and/or transfer the call 102 from the calling device 103 to the communication device 107 over such communication links.

As depicted, the caller 104 may be operating the calling device 103 to make the call 102 to the device 101 to report an incident via speech spoken by the caller 104 (e.g. "There is a fire at one two one north west lissel street", and the like). As such, the call 102 is generally associated with an address 111 which may be received via the caller 104 speaking the address 111 (e.g. "121 north west lissel street") on the call 102. In particular the call 102 may be a 911 call, and the like to the device 101. As depicted, the device 101 may further determine an incident type 112 which, as depicted, may also be received on the call 102 (e.g. "Fire"). As depicted, the device 101 may further determine an estimated location 113 of the calling device 103 using, for example, metadata received in association with the call 102, such as triangulation data, and the like; an automatic location identification system (ALI) may be used to determine the estimated location 113 from the metadata, and the like. In some examples, the estimated location 113 may be used as the address 111, for example when the caller 104 does not speak an address on the call 102, the estimated location 113 may be used as the address 111. In yet further examples, the calling device 102 may provide the estimated location 113 to the device 101, for example in the form of Global Positioning System (GPS) coordinates, and the like, determined by a GPS device, and the like (e.g. a location determining device) at the calling device 102.

In some examples, the device 101 may answer the call 102 and, using a text-to-speech module (described below) communicate with the caller 104 and transcribe speech of the caller 104 to text using a speech-to-text module (e.g. also described below) prior to transferring the call 102 to the communication device 107 and the call-taker 108; in these examples the device 101 may determine the address 111 and the incident type 112 via transcribed text. However, in other examples, the device 101 may answer the call 102 and transfer the call 102 to the communication device 107 and the call-taker 108 so that the call-taker 108 may speak with the caller 104 and verbally receive the address 111 and the incident type 112 which may be provided to the device 101 via an input device at the communication device 107, such as a keyboard and the like.

As will be described hereafter, the device 101 is generally configured to: determine an address associated with a call (e.g. the address 111 associated with the call 102); determine whether the address has previously been corrected to one or more different addresses using historical address correction data; and in response to the address having been previously corrected to the one or more different addresses, control a notification device (e.g. the notification device 109) to provide a notification.

The device 101 may determine whether the address has previously been corrected to one or more different addresses using historical address correction data. For example, as depicted, the system 100 further comprises at least one historical address correction database 196 (interchangeably referred to hereafter as the database 196) in communication with the device 101. The database 196 may comprise any suitable database and/or memory, and the like, where records of historical address correction data 197, and the like, may be stored. For example, such historical address correction data 197 may include addresses (e.g. the address 111) that have previously been corrected to the one or more different addresses and/or addresses that have had first responders incorrectly dispatched thereto, and the like. The historical address correction data 197 may optionally include one or more corrected addresses (e.g. different addresses from the address 111) to which the first responders were later dispatched.

Hence, in general, the historical address correction data 197 comprises data which may be used to determine whether an address associated with a call, even when matching a valid address (e.g. an existing address), has been corrected to a new and/or different address in the past. In other words, in some examples the address 111 may be a non-existent address (e.g. as the caller 104 may be confused and recited a non-existing address on the call 102) or an existing address (e.g. the caller 104 may recite an existing address on the call 102 which is not an address of the incident).

Furthermore, in some examples, the historical address correction data 197 may further indicate respective incident types associated with addresses that have previously been corrected to (and/or confused with) the one or more different addresses and/or addresses that have had first responders incorrectly dispatched thereto. Hence, for example, an address of the historical address correction data 197 may be stored in association with an incident type indicating a type of incident that was reported at a given address (e.g. a "Fire", a "robbery" and the like).

Indeed, the historical address correction data 197 may include, but is not limited to: an address reported by a caller, including unknown addresses and/or locations; indications as to whether a reported address was correct or not correct (e.g. wrong); a correct address, which may be been determined via a dialog with a caller; questions and answers used to establish the correct address; addresses that were never found (e.g. by a call-taker, a 911 operator, a dispatcher, and the like).

Indeed, the historical address correction data 197 may include question data which may be used to generate one or more questions which may be asked by the call-taker 108 on the call 102 to determine a correct address for the address 111 (e.g. assuming the address 111 is not a correct address). The question data may comprise one or more of: historical questions; historical answers to the historical questions; and historical dispatch data. For example, historical questions may be questions that were previously asked by a call-taker to determine a correct address. Historical answers to the historical questions may be the answers received from a caller on a call when a question was asked. Historical dispatch data may comprise an address to which a first responder was historically incorrectly dispatched, and a correct address to which the first responder was later dispatched.

In some examples, the device 101 may determine whether a spelling of an address is related to one or more known locations within a geographic area associated with one or more of a call and the address. For example, as depicted, the system 100 further comprises at least one map database 198 (interchangeably referred to hereafter as the database 198) in communication with the device 101. The database 198 may comprise any suitable database and/or memory, and the like, where records of known locations 199 and the like, may be stored. For example, such known locations 199 may include street addresses and/or maps, and the like, of geographical areas and/or locations which are serviced by the PSAP, and/or any other suitable geographic areas and/or locations. The database 198 may be used to determine whether a spelling of an address is related to one or more of the known locations 199 within a geographic area associated with one or more of a call (e.g. associated with the address) and the address. The geographic area used to search the database 198 may be based on the estimated location 113.

Similar to the historical address correction data 197, in some examples, one or more of the known locations 199 may be stored in association with respective incident types that have occurred at a known location 199. Hence, for example, an address of a known location 199 be stored in association with an incident type indicating a type of incident for which first responders were dispatched to the address (e.g. a "Fire", a "robbery" and the like). In some of these examples, the known locations 199 may form a "heat map" showing locations of incidents and/or incident types (e.g. for a period of time, such as a previous year, and the like).

While aspects of the present specification, described below, may use incident types, such as the incident type 112, it is understood that use of incident types herein may be optional. Indeed, use of the estimated location 113 and/or the known locations 199 may also be optional.

Figure 2:
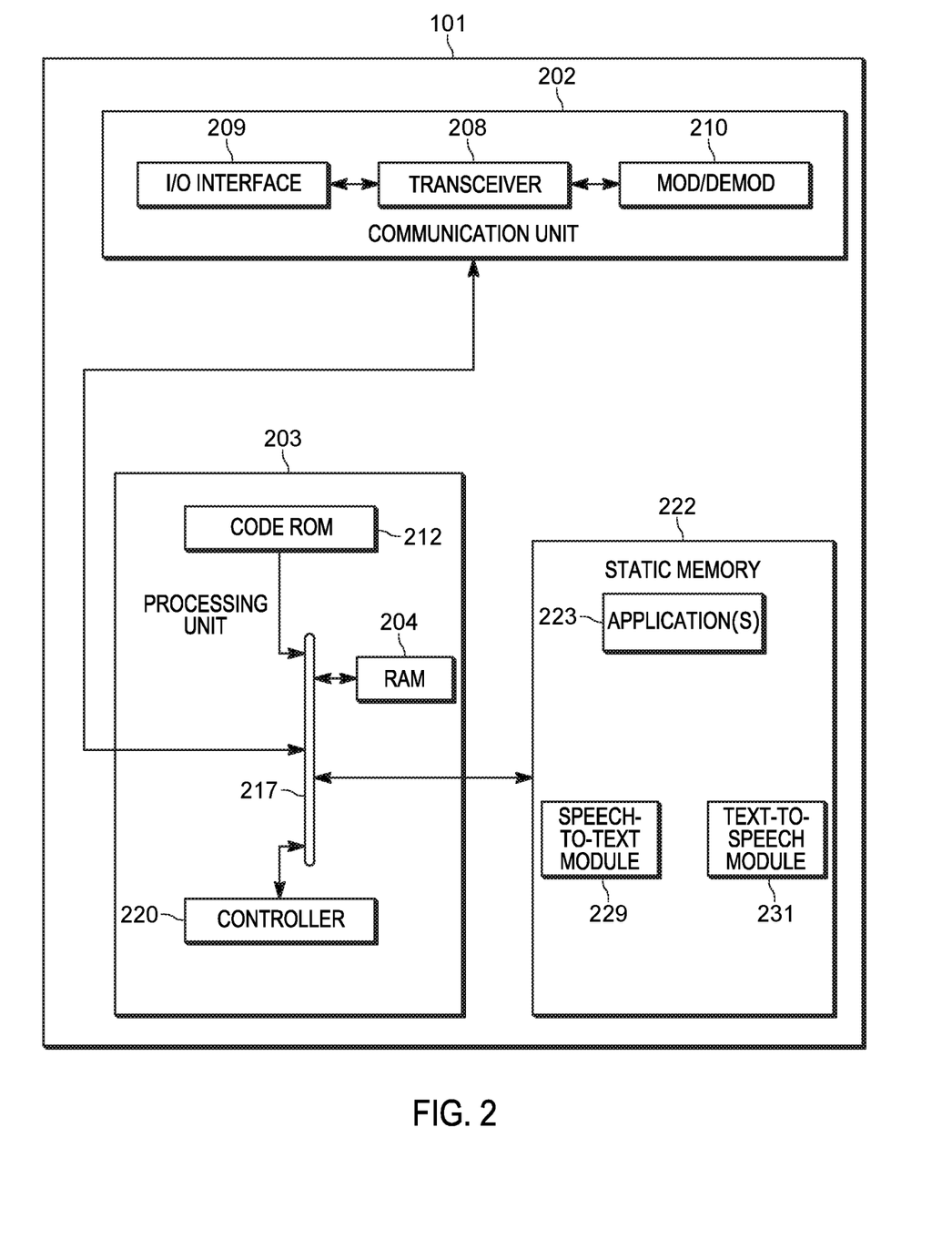
FIG. 2 is a device diagram showing a device structure of computing device for address validation, in accordance with some examples.

Attention is next directed to FIG. 2 which depicts a schematic block diagram of an example of the device 101. In general, the device 101 may comprise one or more servers and/or one or more cloud computing devices, and the like, configured to communicate with the calling device 103 and the communication device 107. However, the device 101 may comprise a computing device such as a personal computer and/or a laptop computer, and the like. In some examples, the device 101 may be combined with the communication device 107. The device 101 may be located at a PSAP, and the like, and/or remote from a PSAP, and the like. Similarly, the device 101 may be located at a same facility (e.g. a PSAP) as the communication device 107, and the like, and/or the device 101 and the communication device 107 may be remote from each other; indeed, the communication device 107 may be remote from a PSAP, and the like.

As depicted, the device 101 comprises: a communication unit 202, a processing unit 203, a Random-Access Memory (RAM) 204, one or more wireless transceivers 208, one or more wired and/or wireless input/output (I/O) interfaces 209, a combined modulator/demodulator 210, a code Read Only Memory (ROM) 212, a common data and address bus 217, a controller 220, and static memory 222 storing at least one application 223. Hereafter, the at least one application 223 will be interchangeably referred to as the application 223.

While not depicted, the device 101 may include one or more of an input device and a display screen and the like, a microphone (e.g. to receive voice commands) such that a user, such as the call-taker 108, may interact with the device 101. However, a user, such as the call-taker 108, may interact with the device 101 via the communication device 107.

As shown in FIG. 2, the device 101 includes the communication unit 202 communicatively coupled to the common data and address bus 217 of the processing unit 203.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222.

The communication unit 202 may include one or more wired and/or wireless input/output (I/O) interfaces 209 that are configurable to communicate with the calling device 103 and the communication device 107. For example, the communication unit 202 may include one or more transceivers 208 and/or wireless transceivers for communicating with the calling device 103 and/or the communication device 107. Hence, the one or more transceivers 208 may be adapted for communication with one or more communication networks used to communicate with the calling device 103 and/or the communication device 107. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) networks, a Worldwide Interoperability for Microwave Access (Wi-MAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a Bluetooth transceiver, a Wi-Fi transceiver, a WiMAX transceiver, and/or another similar type of wireless transceiver configurable to communicate via a wireless radio network.

The communication unit 202 may optionally include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g. hardware ports) for coupling to other hardware components.

The controller 220 includes one or more logic circuits, one or more processors, one or more microprocessors, one or more ASIC (application-specific integrated circuits) and one or more FPGA (field-programmable gate arrays), and/or another electronic device. In some examples, the controller 220 and/or the device 101 is not a generic controller and/or a generic device, but a device specifically configured to implement functionality for address validation. For example, in some examples, the device 101 and/or the controller 220 specifically comprises a computer executable engine configured to implement functionality for address validation.

The static memory 222 is a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the device 101 as described herein are maintained, persistently, at the memory 222 and used by the controller 220 which makes appropriate utilization of volatile storage during the execution of such programming instructions.

As depicted, the memory 222 further stores a speech-to-text module 229 and a text-to-speech module 231, which may be used by the device 101 and/or the controller 220 while implementing the application 223. The speech-to-text module 229 may be to convert speech and/or addresses (e.g. as received on a call 102) to text, and the text-to-speech module 231 may be to convert text to speech for example in examples where the device 101 provides notifications in the form of sound (e.g. at a speaker of the communication device 107), and the like.

Figure 3:
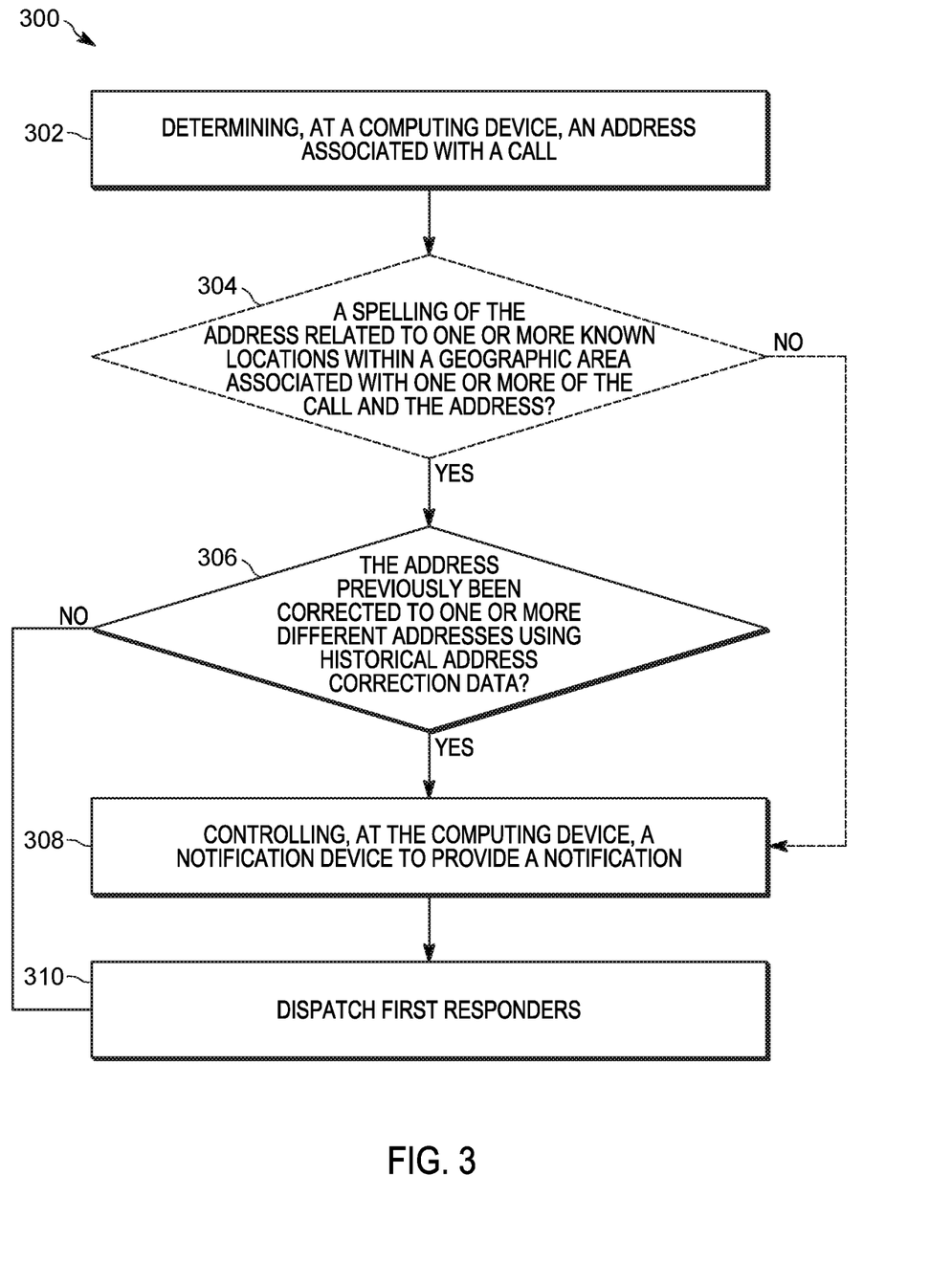
FIG. 3 is a flowchart of a method for address validation, in accordance with some examples.

In particular, the memory 222 stores instructions corresponding to the at least one application 223 (and which may include the modules 229, 231) that, when executed by the controller 220, enables the controller 220 to implement functionality for address verification including, but not limited to, the blocks of the method set forth in FIG. 3.

In illustrated examples, when the controller 220 executes the one or more applications 223, the controller 220 is enabled to: determine an address associated with a call (e.g. the address 111 associated with the call 102); determine whether the address has previously been corrected to one or more different addresses using historical address correction data; and in response to the address having been previously corrected to the one or more different addresses, control a notification device (e.g. the notification device 109) to provide a notification.

The application 223 may include numerical algorithms to one or more of: determine an address associated with a call; determine whether an address has previously been corrected to one or more different addresses using historical address correction data; determine whether a spelling of an address is related to one or more known locations within a geographic area associated with one or more of a call and the address; and generate one or more questions associated with determining a correct address for an address.

Alternatively, the application 223 may include machine learning and/or deep-learning based algorithms and/or neural networks, and the like, which have been trained to one or more of: determine an address associated with a call; determine whether an address has previously been corrected to one or more different addresses using historical address correction data; compare an address with known locations based on a spelling of the address and a geographic area associated with one or more of a call and the address; and generate one or more questions associated with determining a correct address for an address.

Furthermore, in these examples, the application 223 may initially be operated by the controller 220 in a training mode to train the machine learning and/or deep-learning based algorithms and/or neural networks of the application 223 to one or more of: determine an address associated with a call; determine whether an address has previously been corrected to one or more different addresses using historical address correction data; compare an address with known locations based on a spelling of the address and a geographic area associated with one or more of a call and the address; and generate one or more questions associated with determining a correct address for an address.

In some of these examples, or more machine learning algorithms may use fuzzy logic, and the like, to compare a spelling of an address and one or more known locations and assign a confidence level of such a comparison (e.g. the confidence level indicative of a degree of a match, and the like, between spelling of an address and one or more known locations).

The one or more machine learning algorithms and/or deep learning algorithms and/or neural networks of the application 223 may include, but are not limited to: a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public-safety environments, such as a 911 call center. Any suitable machine learning algorithm and/or deep learning algorithm and/or neural network is within the scope of present examples.

While details of the calling device 103 and the communication device 107 are not depicted, the calling device 103 and the communication device 107 may have components similar to the device 101 adapted, however, for the functionality of the calling device 103 and the communication device 107. For example, the calling device 103 and/or the communication device 107 may include respective display screens (e.g. such as the notification device 109 as depicted), speakers, microphones, location determining devices (e.g. GPS devices), and the like. In some examples, the calling device 103 (and/or infrastructure relaying the call 102 between the devices 101, 103) may provide metadata to the device 101 on the call 102, for example a location (e.g. as determined via a GPS device, and the like), a phone number, a network identifier, network data, triangulation data, and the like, which may be used to determine the address 111.

Attention is now directed to FIG. 3 which depicts a flowchart representative of a method 300 for address validation. The operations of the method 300 of FIG. 3 correspond to machine readable instructions that are executed by the device 101, and specifically the controller 220 of the device 101. In the illustrated example, the instructions represented by the blocks of FIG. 3 are stored at the memory 222 for example, as the application 223. The method 300 of FIG. 3 is one way in which the controller 220 and/or the device 101 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 220 and/or the device 101 determines the address 111 associated with the call 102. For example, the caller 104 may call the device 101 to report an incident and verbally provide an address over the call, which may or may not be a correct address of the incident. The caller 104 may further report an incident type on the call 102. For example, as described above, the caller 104 may say "There is a fire at one two one north west lissel street"; in this example, the address 111 may be "121 NW Lissel Street" and the incident type 112 may be a "Fire".

In some examples, the speech-to-text module 229 may be used to transcribe speech on the call 102 to text, and the application 223 may be used to determine whether the text from the transcribed speech includes an address, such as the address 111. The address from the transcribed speech may not be a correct address of the incident due to the caller 104 reporting a wrong address and/or the speech-to-text module 229 incorrectly transcribing an address as the incorrect address 111. Put another way, the determining the address 111 associated with a call 102 may comprise one or more of: monitoring the call 102 using the speech-to-text module 229; transcribing the call 102 using the speech-to-text module 229; and determining, at the speech-to-text module 229, text indicative of the address 111.

Alternatively, the application 223 may include an ALI system and/or module, which may be used to identify the address 111 from metadata associated with the call 102, which may or may not be the correct address (e.g. due to errors which may occur in the ALI system and/or the metadata). Alternatively, the estimated location 113 may be received from the calling device 102 as described above. In some examples, the address 111 may comprise the estimated location 113.

In some examples, however, the address 111 and the incident type 112 may be verbally provided to the call-taker 108, as described above, who may enter the address 111 and the incident type 112 via an input device at the communication device 107, such as a keyboard and the like. In these examples, the determining the address 111 associated with the call 102 may comprise: receiving the address 111 at an input device. Again, the address 111 may not be the correct address of the incident due to the caller 104 providing incorrect information and/or the call-taker 108 typing in the wrong address.

It is further understood that the address 111 may be generally derived from data received in association with the call 102 and hence the address 111 is associated with the call 102.

However, any suitable method and/or process for determining the address 111 associated with the call 102 is within the scope of the present specification.

In some examples, the caller 104 may report the address 111 in the form of speech on the call 102 and the device 101 may also determine the estimated location 113 as described above. In general, the controller 220 and/or the device 101 is configured to distinguish between the address 111, for example as received as speech on the call 102, and the estimated location 113 from which the call 102 is received, though, in some examples, the address 111 and the estimated location 113 may be the same and/or similar.

Continuing with the above example, regardless of how the address 111 is received, the device 101 may determine that the address 111 associated with the call 102 is "121 W Lissel Street". For the following example, the device 101 may further the estimated location 113.

At an optional block 304, the controller 220 and/or the device 101 may determine whether a spelling of the address 111 is related to one or more known locations within a geographic area associated with one or more of the call 102 and the address 111. The block 304 may be performed in order to determine whether or not to check the address 111 against the database 196 and/or to assist the device 101 with ranking one or more different addresses (e.g., determined using the database 196, as described below) by a likelihood of being a correct address.

For example, the address 111 may be compared to the known locations 199 stored at the database 198, for example within a geographic area around the estimated location 113, which may be a geographic area of a given radius around the estimated location 113 and/or a geographic area associated with the PSAP, and the like, which may or may not include the address 111, and/or any other suitable geographic area. Such a limit on searching the spelling of the address 111 against the known locations 199 may be referred to as a spelling-geo-proximity search.

Regardless of how the geographic area is selected, the controller 220 and/or the device 101 may compare the address 111 with the known locations 199 based on a spelling of the address 111 and the geographic area associated with one or more of the call 102 and the address 111. For example, the controller 220 and/or the device 101 may search the known locations 199 within a radius (and the like) of the estimated location 113 for addresses that have a similar and/or a same spelling as the address 111.

For example, continuing with the example provided above, the actual address of the incident reported by the caller 104 may be "112 NW Lisle Avenue". However the caller 104 may mispronounce and/or misidentify the actual address as "one two one west lissel street", which may cause device 101 to receive the address 111 transcribed as "121 W Lissel Street".

Hence, the controller 220 and/or the device 101 may search the database 198 (e.g., within a radius (and the like) of the estimated location 113) for known locations 199 having spellings that may be similar to, but not exactly as, "121 W Lissel Street". In a specific example, the known locations 199 may include "121 Little Street", "112 NW Lisle Avenue" and the like which have spellings similar to 112 NW Lisle Avenue". Indeed, the application 223 and/or machine learning algorithms thereof may use fuzzy logic, and the like, to compare the address 111 with the known locations 199 based on a spelling of the address 111.

In some examples, at the block 304, the determination of whether a spelling of the address 111 is related to one or more known locations 199 within a geographic area associated with one or more of the call 102 and the address 111, may be threshold based. For example, as described above, there may not be an exact match between the spelling of the address 111 and the known locations 199; however, the controller 220 and/or the device 101 may assign a confidence value to the spelling of the address 111 being related to a known location 199 and/or a respective confidence value to the spelling of the address 111 being related to a plurality of the known location 199. A confidence level, for example, may be between 0% and 100%, and the like. When a confidence level of a comparison between the spelling of the address 111 and a known location 199 is greater than a threshold confidence level (e.g. 70%, and/or any other suitable confidence level) the controller 220 and/or the device 101 may determine the spelling of the address 111 is related to the known location 199.

For example, the address "121 Little Street" may have a lower confidence level than the address "112 NW Lisle Avenue".

In some examples, the search of the database 198 may be further based on the incident type 112 such that the controller 220 and/or the device 101 determines that a spelling of the address 111 is related to one or more of the known locations 199, associated with the incident type, within the geographic area. For example, the controller 220 and/or the device 101 may search the database 198 for known locations 199 for which the spelling of the address 111 is related, and at which previous incidents of the incident type 112 have occurred. For example, the address "112 NW Lisle Avenue" may be associated with an incident type "Fire", while the address "121 Little Street" may not be associated with an incident type "Fire". Hence, for example, the search of the database 198 may be further limited to known locations 199 associated with the incident type 112.

At the block 304, the controller 220 and/or the device 101 may determine that the spelling of the address 111 is related to one or more of the known locations 199 within the geographic area (e.g. a "YES" decision at the block 304).

In response to the spelling of the address 111 being related to one or more known locations 199 within a geographic area (e.g. a "YES" decision at the block 304), at a block 306, the controller 220 and/or the device 101 may determine whether the address 111 has previously been corrected to one or more different addresses using the historical address correction data 197.

Put another way, the method 300 may include: comparing the address 111 with the known locations 199 based on a spelling of the address 111 and a geographic area associated with one or more of the call 102 and the address 111 (e.g. the estimated location 113); and, in response to the spelling of the address 111 being related to one or more of the known locations 199 within the geographic area: implementing the determining whether the address 111 has previously been corrected to the one or more different addresses using the historical address correction data 197.

When the incident type 112 is determined, the method 300 may include, but is not limited to: determining an incident type 112 associated with the call 102, as described above, and the determining whether the address 111 has previously been corrected to the one or more different addresses may further be based on the incident type 112. For example, the comparing the address 111 to the historical address correction data 197 to determine whether the address 111 is stored at the database 196 may include comparing the address 111 to addresses of the historical address correction data 197 associated with an incident type at the database 196 that is the same as, and/or similar to, the incident type 112 (e.g. when the incident type 112 indicates a "Fire", historical address correction data 197 associated with "Fire" may be searched but historical address correction data 197 associated with other incident types may not be searched).

Similarly, when the incident type 112 is determined, and a search of the database 198 is limited by the incident type 112, as described above, the method 300 may include, but is not limited to: determining an incident type 112 associated with the call 102; and determining that a spelling of the address 111 is related to one or more known locations 199, associated with the incident type 112, within a geographic area associated with one or more of the call 102 and the address 111; and in response to the spelling of the address 111 being related to one or more of the known locations 199, associated with the incident type 112, within the geographic area: implementing the determining whether the address 111 has previously been corrected to the one or more different addresses using the historical address correction data 197.

The controller 220 and/or the device 101 may determine whether the address 111 has previously been corrected to one or more different addresses by comparing the address 111 to the historical address correction data 197 to determine whether the address 111 is stored at the historical address correction data 197 (e.g., in a database lookup). Put another way, the address 111 may have been previously corrected to the one or more different addresses, and a record thereof may be stored as historical address correction data 197. Similarly, the address 111 may have previously had first responders incorrectly dispatched thereto, and a record thereof may be stored as historical address correction data 197. Such historical address correction data 197 may alternatively include one or more corrected addresses to which the first responders were later dispatched and/or question data indicating questions and/or answers asked previously asked to clarify the address 111.

Furthermore, the different addresses determined at the block 306 may be the same or different as the known locations 199 determined at the block 304. For example the known locations 199 determined at the block 304 may provide an indication of whether or not there is a likelihood of the address 111 having been previously confused with another address (e.g., as there may be known locations 199 with spellings similar to the address 111), while the determination at the block 306 may indicate different addresses with which the address 111 were previously confused.

However, the block 306 may be implemented without the optional block 304 being implemented. Regardless, at the block 306, the controller 220 and/or the device 101 may search the historical address correction data 197 at the database 196 for addresses that match (and/or least partially match) the address 111. For example, the address "121 NW Lissel Street" may have been previously stored at the database 196 (e.g. as the historical correction address data 197) as an address which has been previously corrected to another address (such as "112 NW Lisle Avenue" and/or "121 Little Street" and/or "123 SW Lisle Avenue"). Details of this example are described below with respect to FIG. 4.

In some examples, the historical address correction data 197 may indicate a number of times that the address 111 was corrected to another given address; for example the address 111 may have been corrected to the address "112 NW Lisle Avenue" more times than the address "121 Little Street" and/or more times than the address "123 SW Lisle Avenue".

The incident type 112 may further be used to determine whether any of the addresses to which the address 111 had been previously corrected are associated with the same incident type as that of the incident type 112.

When more than one address (e.g. to which the address 111 has been previously corrected) is found, the addresses may be ranked. For example, the ranking may be based on a spelling of the address 111 compared to spellings of the one or more different addresses to which the address 111 has previously been corrected. Such a ranking may be based on confidence levels as described above. Similarly, a ranking may be based respective locations of the one or more different addresses in relation to the address 111, for example as determined using the database 198. For example, the address "112 NW Lisle Avenue" may be closer to the estimated location 113 of the calling device 103 than the address "121 Little Street" and hence the address "112 NW Lisle Avenue" may be higher ranked than the address "121 Little Street"; when the address 111 comprises a real address, the location based ranking may be based on the address 111 and/or a combination of the address 111 and the estimated location 113.

In some examples, the ranking may be further based on incident types. For example addresses associated with a same incident type may be ranked higher than addresses associated with a different incident type. Similarly, the ranking may be further based on a number of times the address 111 was corrected to a given address. For example, the address 111 may have been corrected to first given address a first number of times, and the address 111 may have been corrected to second given address a second number of times, the first given address may be ranked higher than the second given address.

Hence, in some examples, when the notification device 109 comprises a display screen, the controller 220 and/or the device 101 may control the display screen to render a list of the one or more different addresses ranked by a likelihood of being a correct address based on one or more of: a spelling of the address 111 compared to spellings of the one or more different addresses; respective locations of the one or more different addresses in relation to one or more the address 111 and a location of a calling device 103 that initiated the call 102; respective incident types associated with the one or more different addresses and the incident type 112 associated with the call 102; and a respective number of times that the address 111 was one or more of corrected to, and confused with, the one or more different addresses.

In response to the address 111 having previously been corrected to one or more different addresses (e.g. a "YES" decision at the block 306), at a block 308, the controller 220 and/or the device 101 controls the notification device 109 to provide a notification.

For example, when the notification device 109 comprises a display screen, the controller 220 and/or the device 101 may control the display screen to render a list of the one or more different addresses ranked by a likelihood of being a correct address based on one or more of: a spelling of the address 111 compared to spellings of the one or more different addresses; and respective locations of the one or more different addresses in relation to one or more the address 111 and a location of a calling device 103 that initiated the call 102. The ranking may, however, be based on any suitable factors such as incident type, and a number of times the address 111 was corrected to a given address, as described above. Furthermore, when the notification device 109 comprises a speaker, the notification may be in the form of sound played at the speaker (e.g. using the text-to-speech module 231).

In yet further examples, the notification of the block 308 may include questions that the call-taker 108 may ask the caller 104 on the call 102. For example, the controller 220 and/or the device 101 may generate one or more questions associated with determining a correct address for the address 111, and, when the notification device 109 comprises a display screen, at the block 308 the controller 220 and/or the device 101 may: control the display screen to render the one or more questions. Alternatively, the questions may be asked using a speaker and the text-to-speech module 231.

The questions may be generated based on one or more of: historical questions (e.g. that may have been asked previously in relation to the address 111, such as "do you mean "Lisle Avenue spelled L-I-S-L-E?"; historical answers to the historical questions (e.g. "The street is spelled L-I-S-L-E"); and historical dispatch data (e.g. records of dispatches to Lisle Avenue when Lissel Street was initially reported as an incident address), and the like.

Returning to the optional block 304 in response to the spelling of the address 111 not being related to one or more known locations within a geographic area (e.g. a "NO" decision at the block 304), the controller 220 and/or the device 101 may implement the block 308, however the notification, which the notification device 109 is controlled to provide, may be different from when the block 308 is implemented (e.g. when a "YES" decision occurs at the block 306). For example, the notification in this example may include questions generated as described above, but not a ranked list of different addresses.

Returning to the block 306, in response to the address 111 not having been corrected to one or more different addresses (e.g. a "NO" decision at the block 306), the method 300 may include, at the block 310, first responders being dispatched to the address 111; similarly, the method 300 may end at the block 310 following the block 308 but with first responders dispatched to a corrected address. Dispatching first responders may occur via the call-taker 108 controlling the communication device 107 to dispatch the first responders and/or an incident report may be generated and provided to a communication device of a dispatcher (e.g. when the call-taker 108 is not a dispatcher) who may control such a communication device to dispatch the first responders and/or the device 101 may automatically dispatching the first responders (e.g. by monitoring the call 102 to determine when a corrected address is determined and/or that the address 111 is a correct address).

In some examples, and again returning to the blocks 304, 308, the notification provided at the block 308 may depend a number of the known locations 199 to which the spelling of the address 111 is related as determined at the block 304. Such a number may be "0" (e.g. a "NO" decision at the block 304, described below), "1" (e.g. a "YES" decision at the block 304), or "2" or more (e.g. a "YES" decision at the block 304).

When the number is "0", and the block 308 is implemented without the block 306, questions as described above may be generated and provided at the notification device 109. Such questions may include, but are not limited to, generic address/location clarification questions (e.g. "Can you verify a spelling of the address of the incident"; "Do you see any landmarks?").

When the number is "1" or "2", and the block 306 and the block 308 are implemented (e.g. assuming a "YES" decision at the block 306), a ranked list of different addresses may be provided at the notification device 109 and/or questions may be provided at the notification device 109.

While not depicted, the method 300 may further include updating the historical address correction data 197 at the database 196 with data generated during a call. For example, when the address 111 is corrected, the historical address correction data 197 is updated to indicate the correction as well as any associated information such as the incident type 112, a number of times that the address 111 was corrected to and/or confused with a given address, whether or not a dispatch was made to a wrong address, and the like. The historical address correction data 197 may be further updated to include questions asked on the call 102 and/or answers to the questions, and the like.

In yet further examples, the method 300 may be further adapted to generate questions when a spelling of an address is determined to be related to one or more known locations 199 at the block 304 (e.g. a "YES" decision the block 304) but the address has not been previously corrected to one or more different addresses (e.g. a "NO" decision at the block 306). In such examples, in response to a "NO" decision at the block 306, the controller 220 and/or the device 101 may generate questions, as described above, and provide the questions at the notification device 109, for example prior to dispatching responders at the block 310. Put another way, in these examples, both a "YES" decision and a "NO" decision at the block 306 may cause the controller 220 and/or the device 101 to implement the block 308, however the notification provided by the notification device 109 may depend on whether a "YES" decision or a "NO" decision occurred at the block 306. For example, when a "YES" decision occurs at the block 306, at the block 308, the notification device 109 may be controlled to provide a ranked list of different addresses, as described above. However when a "NO" decision occurs at the block 306, at the block 308, the notification device 109 may be controlled to questions generated to clarify the address 111. Indeed, in some of these examples, the method 300 may include the block 304 but omit the block 306 and notifications at the notification device 109 may be provided whether or not a spelling of an address is determined to be related to one or more known locations 199. For example, when a spelling of an address is determined to be related to one or more known locations 199, a notification may comprise a ranked list of known locations 199 related to a spelling of the address 111; similarly, when a spelling of an address is determined not to be related to one or more known locations 199, a notification may comprise questions generated to clarify the address 111.

In yet further examples, the method 300 may be more explicitly adapted for use of incident types and/or heat maps associated with the known locations 199. For example, the block 304 may be adapted to determine whether a spelling of an address is related to one or more known locations 199, within a geographic area, as described above, associated with a determined incident type (e.g. the incident type 112). In these examples, a known location 199 may be stored with indications of associated incident types, as described above. Hence, for example, when there is a "NO" decision at the block 306 and, at the block 304, the controller 220 and/or the device 101 determines the spelling of the address 111 is related to one or more known locations 199 at which incident types occurred that are the same (and/or similar) to the incident type 112, the controller 220 and/or the device 101 may control the notification device 109 to provide an indication of the one or more known locations 199 at which the same (and/or similar) incident type occurred to prompt the call-taker 108 to clarify the address. Such an indication may include a list (which may be ranked, similar to as described above) of the known locations 199 at which the same (and/or similar) incident type occurred and/or such an indication may include questions generated to clarify the address 111 (e.g. which may be based on the known locations 199 at which the same (and/or similar) incident type occurred). Indeed, in some of these examples, the method 300 may include the block 304 adapted to include a comparison of the incident type 112 against incident types of the known locations 199, but omit the block 306, and notifications at the notification device 109 may be provided whether or not a spelling of an address is determined to be related to one or more known locations 199. For example, when a spelling of an address is determined to be related to one or more known locations 199 of a same and/or similar incident type, a notification may comprise a ranked list of known locations 199 with spelling related to the address 111; similarly, when a spelling of an address is determined not to be related to one or more known locations 199, a notification may comprise questions generated to clarify the address 111. An example such an alternative is provided below with respect to FIG. 5.

Figure 4:
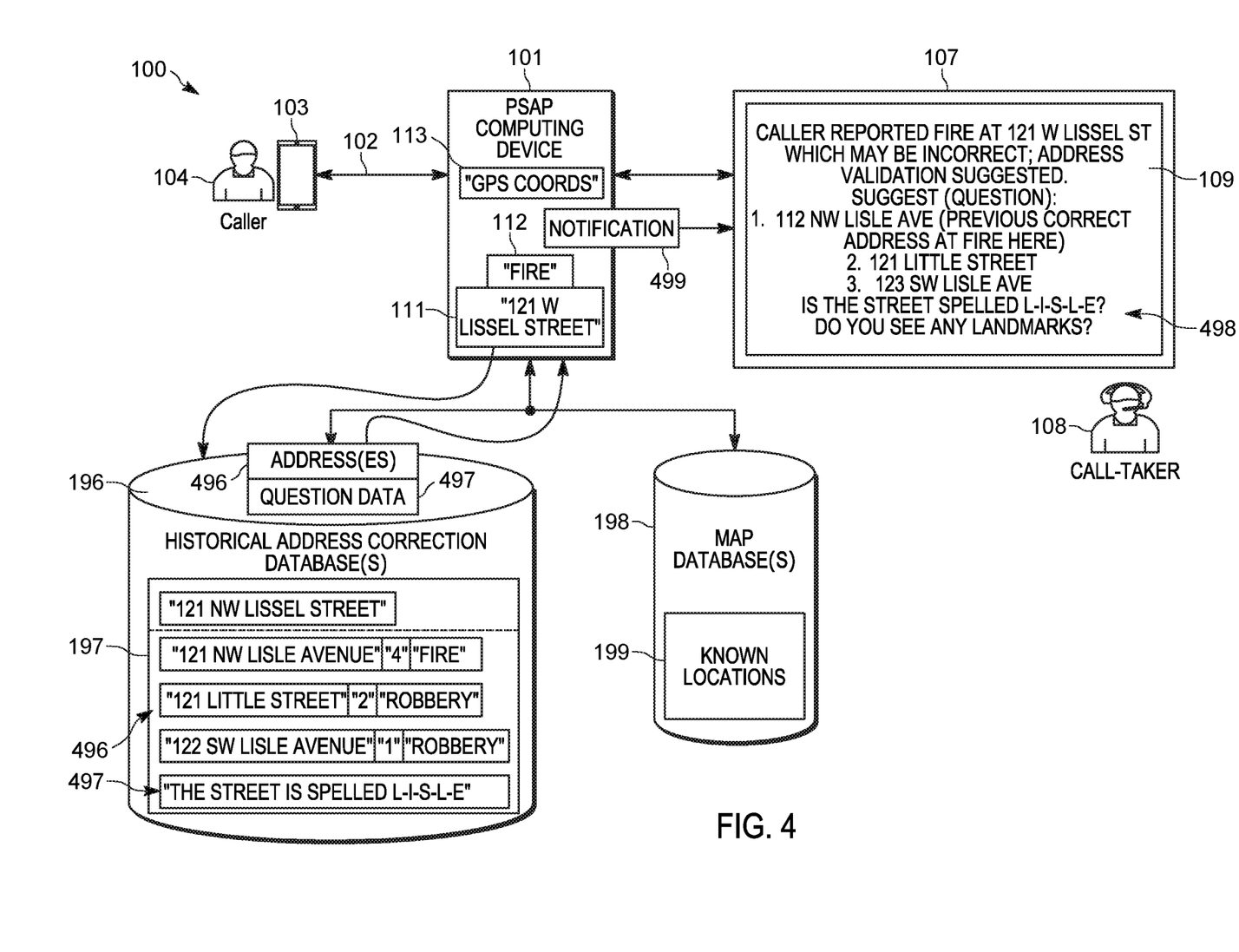
FIG. 4 depicts an example of a method for address validation implemented in the system of FIG. 1, in accordance with some examples.

Attention is next directed to FIG. 4 which depicts an example of the method 300. FIG. 4 is substantially similar to FIG. 1, with like components having like numbers. FIG. 4 depicts the device 101 having determined the address 111 (and the incident type 112) as described above.

As depicted, the address 111 has been determined to be "121 W Lissel Street" while the incident type 112 has been determined to be a "Fire". Similarly, GPS coordinates of the estimated location 113 have been determined.

While FIG. 4 does not depict an example of the block 304 of the method 300, the block 304 may optionally be implemented, as described above. For example, a spelling of the address "121 W Lissel Street" may be used to search the known locations 199 within a geographic area such a given radius of GPS coordinates of the estimated location 113. It is understood in FIG. 4 that the device 101 has determined that the spelling of the address "121 W Lissel Street" is related to one or more of the known locations 199 (e.g. a 'YES" decision at the block 304 of the method 300) and hence the device 101 may search (e.g. at the block 306 of the method 300) the database 196 using the address 111 and optionally the incident type 112.

As depicted, the historical address correction data 197 includes three different addresses 496 stored in association with the address "121 W Lissel Street". Specifically, the addresses "112 NW Lisle Avenue", "121 Little Street", "123 SW Lisle Avenue" are associated with the address "121 W Lissel Street". Furthermore, the addresses "112 NW Lisle Avenue", "121 Little Street", "123 SW Lisle Avenue" are stored in association with: a number of times that the address "121 W Lissel Street" corrected to and/or confused with a given address; and an incident type. For example, the address "121 W Lissel Street" corrected to and/or confused with the address "112 NW Lisle Avenue" "4" times when an incident type of a "Fire" was reported. Similarly, the address "121 W Lissel Street" corrected to and/or confused with the address "121 Little Street" "2" times when an incident type of a "Robbery" was reported. Similarly, the address "121 W Lissel Street" corrected to and/or confused with the address "123 SW Lisle Avenue" "1" time when an incident type of a "Robbery" was reported.

As depicted, the historical address correction data 197 further includes question data 497 in the form of an answer (e.g., "The street is spelled L-I-S-L-E") to a question stored in association with the address "121 W Lissel Street" which was previously used to validate the address "121 W Lissel Street".

As depicted, the address 111 (and optionally the incident type 112) is used in a database lookup, and the like, at the database 196, for example to search (e.g. at the block 306) the historical address correction data 197 for different addresses to which the address 111 was previously corrected.

The addresses 496 are returned to the device 101 along with the question data 497.

The addresses "121 Little Street", "112 NW Lisle Avenue", "123 SW Lisle Avenue" may be ranked, in an order "112 NW Lisle Avenue", 121 Little Street", "123 SW Lisle Avenue", such rankings described above.

Furthermore, as depicted questions 498 may be generated from the question data 497 and/or the addresses 496.

A notification 499 is generated which, as depicted, may include a ranking of the addresses "121 Little Street", "112 NW Lisle Avenue", "123 SW Lisle Avenue". As depicted the notification may include the questions 498. The device 101 provides the notification 499 to the communication device 107 to control (e.g. at the block 306) the notification device 109 to provide the notification 499.

For example, as depicted, the notification includes text "Caller Reported Fire At 121 W Lissel St which may be incorrect; address validation suggested". The notification 499 further includes the addresses "112 NW Lisle Avenue", 121 Little Street", "123 SW Lisle Avenue" as ranked. In this example, the address "112 NW Lisle Avenue" is understood to have been previously been associated with an incident type "Fire" which may be the same as the incident type 112, and indication of such is hence provided (e.g. "(previous fire here)").

The questions 498 are also provided at the notification device 109. As depicted, the questions include a question specific to the address 111 (e.g. "Is the street spelled L-I-S-L-E?"), which may be generated from the question data 497, and a more generic question (e.g. "Do you see any landmarks?"). The call-taker 108 may choose to dispatch first responders to the highest ranked address and/or the call-taker 108 may choose to recite the ranked addresses and/or the questions over the call 102 to the caller 104 to clarify the address 111. Alternatively, the device 101 may automatically communicate with the caller 104 via the text-to-speech module 231 to clarify the address 111 and/or the device 101 may automatically determine an address to dispatch first responders thereto.

When the address 111 is validated and/or corrected the device 101 may update the historical address correction data 197 accordingly, for example based on a dispatch report, an incident report and the like. Further, the device 101 may monitor a conversation between the call-taker 108 and the caller 104 (e.g. using the speech-to-text module 229) to update the historical address correction data 197.

Figure 5:
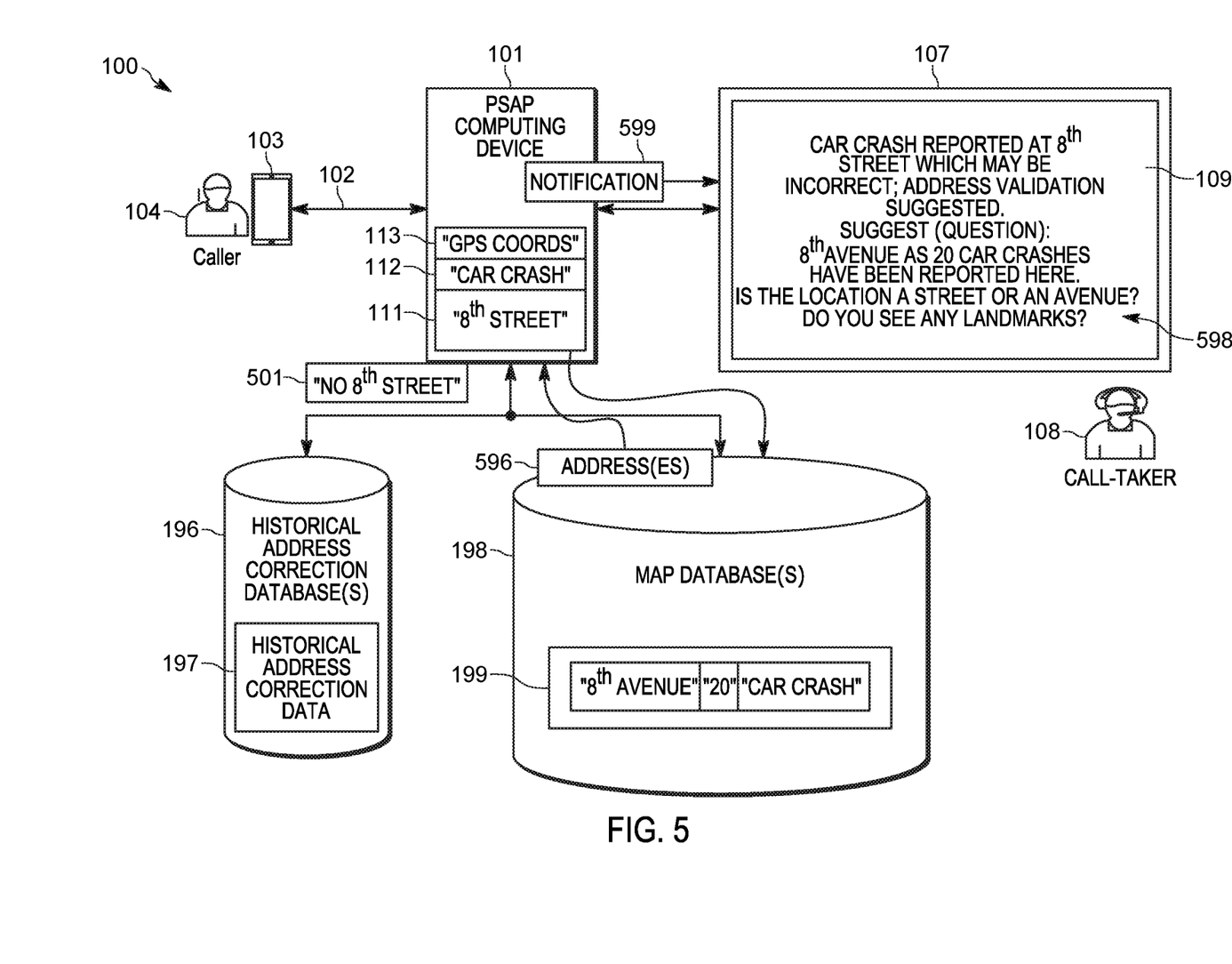
FIG. 5 depicts an example of a method for address validation implemented in the system of FIG. 1, in accordance with some alternative examples.

Attention is next directed to FIG. 5 which depicts an example of the system 100 implementing the method 300 but adapted to provide notifications on the basis of no historical address correction data 197 being associated with an address 111, but a spelling of an address 111, and an associated incident type 112, being related to one or more of known locations 199 within a geographic area. For example, as depicted, the address 111 has been determined to be "8$^{th}$ Street" and the incident type 112 has been determined to be a "Car Crash". The device 101 further determines 501 that "8$^{th}$ Street" is not stored in the historical incident address correction data 197, though such a determination 501 may be optional. However, the device 101 may search the known locations 199 for addresses related to a spelling of "8$^{th}$ Street" that are associated with a "Car Crash" for example in a geographic area determined using the estimated location 112. As depicted, the known locations 199 include an address "8$^{th}$ Avenue" that has a spelling similar to the spelling of the address "8$^{th}$ Street", and at which "20" incident types of a "Car Crash" have occurred. The device 101 hence receives the address 596 of "8$^{th}$ Avenue" (e.g. along with the number of the incident types of a "Car Crash". While only one address 596 is depicted, more than one address 596 may be found (e.g. "8$^{th}$ Road", and the like) which may be ranked to generate a ranked list, as described above. The device 101 may optionally generate questions 598 to clarify the address 111 (e.g. a clarification of whether the street at which the incident occurred is a street or an avenue, and if the caller 102 sees any landmarks). Regardless, the device 101 controls the notification device 109 to provide a notification 599 which, as depicted, may include the address "8$^{th}$ Avenue" as well as the number "20" of the car crashes. As depicted the notification may include the questions 598. The device 101 provides the notification 599 to the communication device 107 to control the notification device 109 to provide the notification 599.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method comprising:
   determining, at a computing device, an address associated with a call;
   comparing the address with known locations based on a spelling of the address and a geographic area associated with one or more of the call and the address; and
   in response to the spelling of the address being related to one or more of the known locations within the geographic area: determining, at the computing device, whether the address has previously been corrected to one or more different addresses using historical address correction data; and
   in response to the address having been previously corrected to the one or more different addresses, controlling, at the computing device, a notification device to provide a notification.

2. The method of claim 1, further comprising:
   determining an incident type associated with the call,
   wherein the determining whether the address has previously been corrected to the one or more different addresses is further based on the incident type.

3. The method of claim 1, further comprising:
   determining an incident type associated with the call; and
   determining that the spelling of the address is related to one or more respective known locations, associated with the incident type, within the geographic area associated with one or more of the call and the address; and
   in response to the spelling of the address being related to one or more of the respective known locations, associated with the incident type, within the geographic area: implementing the determining whether the address has previously been corrected to the one or more different addresses using the historical address correction data.

4. The method of claim 1, wherein the notification device comprises a display screen, and the controlling the notification device to provide the notification comprises:
   controlling the display screen to render a list of the one or more different addresses ranked by a likelihood of being a correct address based on one or more of:
      the spelling of the address compared to spellings of the one or more different addresses;
      respective locations of the one or more different addresses in relation to one or more the address and a location of a calling device that initiated the call;
      respective incident types associated with the one or more different addresses and an incident type associated with the call; and
      a respective number of times that the address was one or more of corrected to, and confused with, the one or more different addresses.

5. The method of claim 1, further comprising:
   generating one or more questions associated with determining a correct address for the address, wherein the notification device comprises a display screen, and the controlling the notification device to provide the notification comprises:
   controlling the display screen to render the one or more questions.

6. The method of claim 5, further comprising generating the one or more questions based on one or more of:
   historical questions;
   historical answers to the historical questions; and
   historical dispatch data.

7. The method of claim 1, wherein the determining the address associated with the call comprises one or more of:
   monitoring the call using a speech-to-text module;
   transcribing the call using the speech-to-text module; and
   determining, at the speech-to-text module, text indicative of the address.

8. The method of claim 1, wherein the determining the address associated with the call comprises:
   receiving the address at an input device.

9. The method of claim 1, wherein the computing device comprises a public-safety answering point (PSAP) computing device.

10. A device comprising:
    a communication unit; and a controller configured to:
       determine an address associated with a call;
       compare the address with known locations based on a spelling of the address and a geographic area associated with one or more of the call and the address;
       in response to the spelling of the address being related to one or more of the known locations within the geographic area: determine whether the address has previously been corrected to one or more different addresses using historical address correction data; and
       in response to the address having been previously corrected to the one or more different addresses, control a notification device to provide a notification.

11. The device of claim 10, wherein the controller is further configured to:
    determine an incident type associated with the call; and
    determine whether the address has previously been corrected to the one or more different addresses further based on the incident type.

12. The device of claim 10, wherein the controller is further configured to:

determine an incident type associated with the call; and
determine that the spelling of the address is related to one or more respective known locations, associated with the incident type, within a geographic area associated with one or more of the call and the address; and
in response to the spelling of the address being related to one or more of the respective known locations, associated with the incident type, within the geographic area: implement determining whether the address has previously been corrected to the one or more different addresses using the historical address correction data.

13. The device of claim 10, wherein the notification device comprises a display screen, and the controller is further configured to control the notification device to provide the notification by:
controlling the display screen to render a list of the one or more different addresses ranked by a likelihood of being a correct address based on one or more of:
the spelling of the address compared to spellings of the one or more different addresses;
respective locations of the one or more different addresses in relation to one or more the address and a location of a calling device that initiated the call;
respective incident types associated with the one or more different addresses and an incident type associated with the call; and
a respective number of times that the address was one or more of corrected to, and confused with, the one or more different addresses.

14. The device of claim 10, wherein the controller is further configured to:
generate one or more questions associated with determining a correct address for the address, wherein the notification device comprises a display screen; and
control the notification device to provide the notification by: controlling the display screen to render the one or more questions.

15. The device of claim 14, wherein the controller is further configured to generate the one or more questions based on one or more of:
historical questions;
historical answers to the historical questions; and
historical dispatch data.

16. The device of claim 10, wherein the controller is further configured to determine the address associated with the call by one or more of:
monitoring the call using a speech-to-text module;
transcribing the call using the speech-to-text module; and
determining, at the speech-to-text module, text indicative of the address.

17. The device of claim 10, wherein the controller is further configured to determine the address associated with the call by:
receiving the address at an input device.

18. The device of claim 10, further comprising a public-safety answering point (PSAP) computing device.

19. A method comprising:
determining, at a computing device, an address associated with a call;
determining, at the computing device, whether the address has previously been corrected to one or more different addresses using historical address correction data; and
in response to the address having been previously corrected to the one or more different addresses, controlling, at the computing device, a display screen to render a list of the one or more different addresses ranked by a likelihood of being a correct address based on one or more of:
a spelling of the address compared to spellings of the one or more different addresses;
respective locations of the one or more different addresses in relation to one or more the address and a location of a calling device that initiated the call;
respective incident types associated with the one or more different addresses and an incident type associated with the call; and
a respective number of times that the address was one or more of corrected to, and confused with, the one or more different addresses.

* * * * *